United States Patent [19]

Voelker et al.

[11] Patent Number: 5,334,337

[45] Date of Patent: * Aug. 2, 1994

[54] PRODUCTION OF FOAM BOARDS OF HIGH COMPRESSIVE STRENGTH USING A BLOWING AGENT MIXTURE

[75] Inventors: Heinz Voelker, Limburgrhof; Gerhard Alicke, Worms; Manfred Weilbacher; Manfred Weilbacher, Frankenthal; Reinhold Weber, Mutterstadt; Horst Schuch, Ilversheim, all of Fed. Rep. of Germany

[73] Assignee: BASF Aktiengesellschaft, Ludwigshafen, Fed. Rep. of Germany

[*] Notice: The portion of the term of this patent subsequent to Jan. 26, 2010 has been disclaimed.

[21] Appl. No.: 975,729

[22] Filed: Nov. 13, 1992

[30] Foreign Application Priority Data

Nov. 22, 1991 [DE] Fed. Rep. of Germany ....... 4138388

[51] Int. Cl.$^5$ ............................................. B29C 67/22
[52] U.S. Cl. ..................................... 264/45.3; 264/50; 264/53; 264/DIG. 5
[58] Field of Search ............... 264/50, 51, 53, DIG. 5, 264/45.3; 521/79

[56] References Cited

U.S. PATENT DOCUMENTS

| | | | |
|---|---|---|---|
| 4,454,086 | 6/1984 | Corbett et al. | 264/53 |
| 4,681,715 | 7/1987 | Park et al. | 264/DIG. 5 |
| 4,762,860 | 8/1988 | Park | 521/88 |
| 5,095,041 | 3/1992 | Bopp et al. | 521/60 |
| 5,102,591 | 4/1992 | Hasson et al. | 264/50 |
| 5,147,896 | 9/1992 | York | 521/79 |
| 5,182,308 | 1/1993 | Voelker et al. | 521/79 |

FOREIGN PATENT DOCUMENTS

| | | |
|---|---|---|
| 0406206 | 1/1991 | European Pat. Off. . |
| 0439283 | 7/1991 | European Pat. Off. . |
| 0464581 | 1/1992 | European Pat. Off. . |
| WO92/06800 | 4/1992 | PCT Int'l Appl. . |

*Primary Examiner*—Allan R. Kuhns
*Attorney, Agent, or Firm*—Keil & Weinkauf

[57] ABSTRACT

Foam boards of high compressive strength are produced by extruding a mixture of a styrene polymer and from 5 to 16% by weight of a blowing agent which contains a) from 3 to 70% by weight of an alcohol or ketone having a boiling point of from 56° to 100° C.,
b) from 0 to 50% by weight of carbon dioxide,
c) from 0 to 88% by weight of a saturated $C_3$- to $C_5$-hydrocarbon,
d) from 2 to 90% by weight of at least one fluorinated hydrocarbon which has a boiling point of from −30° to +30° C.

2 Claims, No Drawings

PRODUCTION OF FOAM BOARDS OF HIGH COMPRESSIVE STRENGTH USING A BLOWING AGENT MIXTURE

The present invention relates to a process for the production of foam boards of high compressive strength by extruding a mixture of a styrene polymer, a blowing agent and, if desired, conventional additives.

A large number of blowing agents have been proposed for the preparation of foams based on styrene polymers. Methyl chloride is preferred. However, its toxicity means that extreme safety precautions both during preparation and storage of the foam are necessary. In addition, the foam exhibits considerable shrinkage at elevated temperature. If chlorofluorocarbons, such as dichlorodifluoromethane, are used as blowing agent, foams are obtained which expand at elevated temperature. Although mixtures of approximately equal parts of methyl chloride and dichlorodifluoromethane give dimensionally stable foams, they cannot be used due to the toxicity of the methyl chloride. Replacement of methyl chloride by the somewhat less toxic ethyl chloride gives a relatively flexible foam of low compressive strength. Carbon dioxide has also already been recommended as a blowing agent, but it gives open-cell foams which have a high water-absorption capacity.

EP-A 439 283 discloses blowing agent mixtures which comprise a mixture of (a) perfluorinated or partially fluorinated (cyclo)alkanes and (b) one or more compounds from the group consisting of chlorofluorocarbons, fluorinated hydrocarbons and a low-boiling (cyclo)alkane.

EP-A 406 206 describes thermoplastic foams made from styrene polymers containing a pore-forming mixture which comprises dichloromethane and a pore-forming material from the group consisting of chlorofluorocarbons (F 22, F 123, F 124, F 141b, F 142 and F 142b), fluorinated hydrocarbons (F 125, F 134, F 134a, F 143a, F 152a, F 161, F 263 and F 272), fluorocarbon compounds (F 116, F 218), carbon dioxide and mixtures thereof.

EP-A 464 581, which is an earlier patent, but was published after the priority date of the present application, discloses a process for the production of foam boards of high compressive strength which have a crossection of at least 50 cm$^2$ by extruding a mixture of a styrene polymer, from 5 to 15% by weight, based on the styrene polymer, of a blowing agent and, if desired, conventional additives, in which the blowing agent used is a mixture which contains
a) from 3 to 70% by weight of an alcohol or ketone having a boiling point of from 56° to 100° C.,
b) from 5 to 50% by weight of carbon dioxide, and
c) from 0 to 90% by weight of a saturated C$_3$- to C$_5$-hydrocarbon and/or a hydrogen-containing chlorofluorocarbon or fluorinated hydrocarbon having a boiling point of from −30° to +30° C.

It is an object of the present invention to provide a process for the preparation of foams from styrene polymers in which toxic blowing agents are not used and which gives closed-cell foams which have only a low water-absorption capacity, are dimensionally stable and have high compressive strength and heat distortion resistance. It is a further object of the present invention to avoid the use of dichlorodifluoromethane in the foam.

We have found that this object is achieved by using a blowing agent mixture containing an alcohol or a ketone having a boiling point of from 56° to 100° C., carbon dioxide and a fluorinated hydrocarbon which has a boiling point of from −30° to +30° C. and, if desired, a saturated C$_3$- to C$_5$-hydrocarbon.

The present invention accordingly provides a process for the production of foam boards of high compressive strength which have a cross-section of at least 50 cm$^2$ by extruding a mixture of a styrene polymer, from 5 to 16% by weight, based on the styrene polymer, of a blowing agent and, if desired, conventional additives, in which the blowing agent used is a mixture which contains
a) from 3 to 70% by weight of an alcohol or ketone having a boiling point of from 56° to 100° C.,
b) from 0 to 50% by weight of carbon dioxide,
c) from 0 to 88% by weight of a saturated C$_3$- to C$_5$-hydrocarbon,
d) from 2 to 90% by weight of at least one fluorinated hydrocarbon which has a boiling point of from −30° to +30° C.

For the purposes of the present invention, styrene polymers are polystyrene and copolymers of styrene containing at least 50% by weight of styrene in copolymerized form. Examples of suitable comonomers are α-methylstyrene, ring-halogenated styrenes, ring-alkylated styrenes, acrylonitrile, esters of (meth)acrylic acid with alcohols having 1 to 8 carbon atoms, N-vinyl compounds, such as vinylcarbazole, maleic anhydride or small amounts of compounds containing two polymerizable double bonds, such as butadiene, divinylbenzene or butanediol diacrylate.

The blowing agent is used in an amount of from 5 to 16% by weight, preferably from 7 to 15% by weight, in particular from 8 to 14% by weight, based on the styrene polymer, and contains
a) from 3 to 70% by weight, preferably from 5 to 60% by weight, of an alcohol or ketone having a boiling point of from 56° to 100° C., preferably from 56° to 85° C., such as methanol, ethanol, propanol, isopropanol, tert-butanol, isobutanol, acetone or butanone,
b) from 0 to 50% by weight, preferably from 5 to 45% by weight, in particular from 10 to 40% by weight, of carbon dioxide,
c) from 0 to 88% by weight, preferably from 10 to 70% by weight, in particular from 10 to 60% by weight, of a saturated C$_3$-C$_5$-hydrocarbon, such as propane, n-butane, i-butane, neopentane, n-pentane or i-pentane, or a mixture therefore, and
d) from 2 to 90% by weight of a fluorinated hydrocarbon which has a boiling point of from −30° to +30° C., for example pentafluoroethane (HFC-125), tetrafluoroethane (HFC-134a), trifluoroethane (HFC-143a) and difluoroethane (HFC-152a).

The fluorinated hydrocarbons according to the invention can be employed individually or in mixtures. Preference is given to fluorinated hydrocarbon mixtures which contain at least difluoroethane. Particular preference is given to fluorinated hydrocarbon mixtures which contain predominantly or exclusively difluoroethane.

Conventional additives which may be added to the styrene polymer/blowing agent mixture in conventional amounts are antistatics, stabilizers, dyes, lubricants, fillers, flameproofing agents and/or nucleating agents.

The foam boards are produced according to the invention in a manner known per se by extrusion. In an extruder, the styrene polymer plasticized by heating is mixed intimately with the blowing agent mixture and the additives. The mixture then passes through a relaxation zone, in which it is cooled to from 100° to 120° C. with constant stirring and subsequently extruded through a die to give boards.

The foam boards have according to the invention a cross section of at least 50 cm$^2$, preferably from 100 to about 1000 cm$^2$. The invention allows the production of boards having a thickness of up to 200 mm, a width of up to 1200 mm and a density of from 25 to 60 g/l.

The invention is illustrated with reference to the examples below, in which parts are parts by weight.

EXAMPLE 1

100 parts of polystyrene having a melt flow index of 4.5, 1.5 parts of hexabromocyclododecane as flameproofing agent and 1 part of talc for regulating the cell size were fed continuously to an extruder having an internal screw diameter of 120 mm. At the same time, a blowing agent mixture of 28% by weight of ethanol and 72% by weight of HFC-152a (in total 12.3% by weight, based on the polystyrene) was injected continuously into the extruder through an inlet aperture. The gel was compounded uniformly in the extruder and, after a residence time of 15 minutes, cooled to an exit temperature of 105° C. and extruded into the atmosphere through a 300 mm × 1.5 mm die. The foam was passed through a molding channel connected to the extruder, giving a foamed polystyrene board having a cross section of 650 mm × 50 mm. A uniform, closed-cell, shape-stable foam board was obtained.

EXAMPLES 2 TO 7 AND COMPARATIVE EXAMPLES 8 TO 10

The procedures in Examples 2 to 7 and Comparative Examples 8 to 10 were similar to that of Example 1, but the blowing agent mixtures and amounts shown in the Table were employed.

The foam was again passed through a molding channel connected to the extruder, giving a foamed polystyrene board having a cross section of 650 mm × 50 mm. The foamed product was cut into pieces having a cross sectional area of 600 mm × 50 mm and a length of 1250 mm. The samples were tested after 30 days. The λ value shown in the Table was extrapolated from the measurements after 6 months to a storage time of 2 years.

The λ value (coefficient of thermal conductivity) was measured in accordance with DIN 52 612, the foam density in accordance with DIN 53 420, the cell size in accordance with ASTM D 3842-69, the proportion of closed cells in accordance with DIN-ISO 4590, the water-absorption capacity of complete boards in accordance with DIN 53 434, the compressive strength in accordance with DIN 53 421 and the dimensional stability in accordance with DIN 53 431.

TABLE

| Example | Amount of blowing agent, % by weight, based on polystyrene | $CO_2$ % by weight | Ethanol % by weight | Difluoroethane (152a) % by weight | Butane % by weight | Coefficient of thermal conductivity (λ) [W/m · K] |
| --- | --- | --- | --- | --- | --- | --- |
| 2 | 12 | — | 12 | 88 | — | 0.0325 |
| 3 | 12 | — | 12 | 88 | — | 0.0327 |
| 4 | 14 | 10 | 10 | 80 | — | 0.0342 |
| 5 | 9 | 15 | 5 | 65 | 15 | 0.0354 |
| 6 | 16 | 5 | 20 | 50 | 25 | 0.0336 |
| 7 | 13.4 | 45 | 30 | 25 | — | 0.0365 |
| 8 (comp.) | 8.3 | 55 | — | 45 | — | 0.0376 |
| 9 (comp.) | 13.5 | — | — | 100 | — | 0.0354 |
| 10 (comp.) | 10.0 | 45 | 2 | — | 53 | 0.0342 |

TABLE

| Example | Foam density, g/l | Cell size mm | Proportion of closed cells % | Water-absorption capacity % by vol. | Compressive strength [N/mm$^2$] | Dimensional stability at 85° C. in % | | |
| --- | --- | --- | --- | --- | --- | --- | --- | --- |
| | | | | | | Length | Width | Thickness |
| 2 | 29.8 | 0.28 | 98.4 | 0.09 | 0.175 | +1.12 | −0.42 | −0.51 |
| 3 | 32.5 | 0.18 | 97.6 | 0.095 | 0.245 | +1.13 | −0.44 | −0.52 |
| 4 | 33.2 | 0.21 | 96.8 | 0.14 | 0.240 | +0.94 | −0.12 | −0.23 |
| 5 | 34.6 | 0.14 | 95.4 | 0.20 | 0.265 | +3.2 | +1.2 | +0.8 |
| 6 | 32.9 | 0.30 | 96.0 | 0.16 | 0.235 | +5.3 | +2.4 | +3.1 |
| 7 | 36.8 | 0.11 | 93.2 | 0.29 | 0.325 | +0.53 | +0.25 | +0.12 |
| 8 (comp.) | 35.2 | 0.08 | 92.8 | 0.34 | 0.294 | +1.2 | +0.45 | +0.84 |
| 9 (comp.) | 30.6 | 0.45 | 97.2 | 0.11 | 0.198 | +2.1 | −0.9 | −0.74 |
| 10 (comp.) | 39.6 | 0.075 | 88.1 | 0.54 | 0.432 | +6.2 | +4.2 | +2.9 |

We claim:

1. A process for the production of foam boards of high compressive strength which have a cross-section of at least 100 CM$^2$, which comprises extruding a mixture consisting essentially of (1) a polymer component consisting essentially of a styrene polymer, and (2) and 5 to 16% by weight, based on the styrene polymer, of a blowing agent consisting essentially of, based on the weight of the blowing agent:
   a) from 3 to 70% by weight of ethanol,
   b) from 10 to 40% by weight of carbon dioxide,
   c) from 0 to 88% by weight of a saturated $C_3$- to $C_5$-hydrocarbon, and
   d) from 2 to 90% by weight of at least one fluorinated hydrocarbon selected from the group consisting of difluoroethane, trifluoroethane, tetrafluoroethane, and pentafluoroethane.

2. A process for the production of foam boards of high compressive strength which have a cross-section of at least 100 CM$^2$, which comprises extruding a mixture consisting essentially of (1) a polymer component consisting essentially of a styrene polymer, (2) from 5 to 16% by weight, based on the styrene polymer of a blowing agent consisting essentially of, based on the weight of the blowing agent:
 a) from 3 to 70% by weight of ethanol,
 b) from 10 to 40% by weight of carbon dioxide,
 c) from 0 to 88% by weight of a saturated $C_3$- to $C_5$-hydrocarbon, and
 d) from 2 to 90% by weight of at least one fluorinated hydrocarbon selected from the group consisting of difluoroethane, trifluoroethane, tetrafluoroethane and pentafluoroethane and (3) at least one conventional additive selected from the group consisting of antistatics, stabilizers, dyes, lubricants, fillers, flame proofing agents and nucleating agents.

* * * * *

UNITED STATES PATENT AND TRADEMARK OFFICE
CERTIFICATE OF CORRECTION

PATENT NO.: 5,334,337

DATED: August 2, 1994

INVENTOR(S): VOELKER et al.

It is certified that error appears in the above-identified patent and that said Letters Patent is hereby corrected as shown below:

On the title page, item [75], in the listing of the inventors, delete the second "Manfred Weilbacher".

Signed and Sealed this

Fourth Day of October, 1994

Attest:

BRUCE LEHMAN

Attesting Officer     Commissioner of Patents and Trademarks